US012526083B2

United States Patent
Bhattacharyya et al.

(10) Patent No.: US 12,526,083 B2
(45) Date of Patent: Jan. 13, 2026

(54) METHOD AND SYSTEM FOR CONTEXT-BASED RETRANSMISSION OF LOST PACKETS

(71) Applicant: Tata Consultancy Services Limited, Mumbai (IN)

(72) Inventors: Abhijan Bhattacharyya, Kolkata (IN); Madhurima Ganguly, Bangalore (IN); Ashis Sau, Kolkata (IN); Suraj Kumar Mahato, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/742,891

(22) Filed: Jun. 13, 2024

(65) Prior Publication Data
US 2024/0421939 A1 Dec. 19, 2024

(30) Foreign Application Priority Data
Jun. 16, 2023 (IN) .............................. 202321041227

(51) Int. Cl.
*H04L 1/1812* (2023.01)
*H04L 5/00* (2006.01)
*H04W 28/06* (2009.01)

(52) U.S. Cl.
CPC .......... *H04L 1/1819* (2013.01); *H04L 5/0055* (2013.01); *H04W 28/06* (2013.01)

(58) Field of Classification Search
CPC ... H04L 1/1819; H04L 5/0055; H04L 1/1825; H04L 1/188; H04L 1/1887; H04W 28/06
See application file for complete search history.

(56) References Cited

U.S. PATENT DOCUMENTS 7,397,759 B2 * 7/2008 Tan ......................... H04L 69/16
370/216
2003/0103459 A1 * 6/2003 Connors ............... H04L 1/1877
370/235

(Continued)

OTHER PUBLICATIONS

R. de Oliveira and T. Braun, "A dynamic adaptive acknowledgment strategy for TCP over multihop wireless networks," Proceedings IEEE 24th Annual Joint Conference of the IEEE Computer and Communications Societies., Miami, FL, USA, 2005, pp. 1863-1874 vol. 3 (Year: 2005).*

(Continued)

*Primary Examiner* — Cynthia Britt
(74) *Attorney, Agent, or Firm* — Finnegan, Henderson, Farabow, Garrett & Dunner, LLP

(57) ABSTRACT

State of the art data transmission approaches require all the lost data packets to be retransmitted, which may not be required in a variety of scenarios. Existing protocols lack the option to change packet semantics on the fly for individual fragments on the fly for the same stream. Also, parameters including maximum number of retransmissions permitted are set beforehand, one for entire stream. Method and system in embodiments disclosed herein provide an approach for context-based retransmission of lost packets. Method and system disclosed in the embodiments herein identifies one or more packets as lost packets based on reception status of acknowledgement (ACK) within a dynamically adaptive timeout period, and then based on value of a NRTx header field associated with the lost packet, determines whether or not to retransmit the lost packet. Value of the dynamically adaptive timeout period is recalculated dynamically, based on a determined instantaneous channel condition.

20 Claims, 14 Drawing Sheets

(56) References Cited

U.S. PATENT DOCUMENTS

| | | | |
|---|---|---|---|
| 2011/0099437 A1* | 4/2011 | Ramakrishnan | H04L 47/27 |
| | | | 714/704 |
| 2015/0117176 A1* | 4/2015 | Jeon | H04L 49/552 |
| | | | 370/216 |
| 2018/0278372 A1* | 9/2018 | Liang | H04L 1/1883 |
| 2024/0113982 A1* | 4/2024 | Aregala | H04L 1/1887 |

OTHER PUBLICATIONS

Al-Maaitah, Njoud O., "TCP AT-ER: TCP Adaptive Timeout Based-On Early Retransmission Over Manet", Title of the item: Journal of Theoretical and Applied Information Technology, Date: 2019, vol. 97; Issue: 24, Publisher: JATIT & LLS, Link: https://www.jatit.org/volumes/Vol97No24/8Vol97No24.pdf.

Raitahila, Iivo, "Congestion Control Algorithms for the Constrained Application Protocol (CoAP)", Date: 2019, Publisher: University of Helsinki, Link: https://core.ac.uk/download/pdf/226768309.pdf.

* cited by examiner

METHOD AND SYSTEM FOR CONTEXT-BASED RETRANSMISSION OF LOST PACKETS

PRIORITY CLAIM

This U.S. patent application claims priority under 35 U.S.C. § 119 to: Indian patent application No. 202321041227, filed on Jun. 16, 2023. The entire contents of the aforementioned application are incorporated herein by reference.

TECHNICAL FIELD

The disclosure herein generally relates to communication, and, more particularly, to context-based retransmission of lost packets.

BACKGROUND

A very well-known protocol for streaming is MPEG-DASH (Dynamic Adaptive Streaming over HTTP) that uses HTTP (Hypertext Transfer Protocol). HTTP works on the top of TCP (Transmission Control Protocol) protocol. TCP transmits all the data packets in reliable mode for which the transmitter awaits Acknowledgement (ACK) for each packet sent. If ACK is not received within a Timeout period, the lost packet is retransmitted and it adapts the ACK timeout period using exponential backoff. Hence TCP does not provide any option to not retransmit an individual lost packet sent reliably. Another extensively used protocol for delivering audio and video over IP networks is RTP (Real-time Transport Protocol). But, RTP uses UDP (User Datagram Protocol) as underlying transport protocol hence transmits all the packets by a Best Effort mode of delivery. But RTP uses RTCP (Real-Time Transport Control Protocol) protocol to control the transmission and the quality of data being transmitted. Hence all the packets in RTP with RTCP are sent via unreliable mode, therefore no ACK is received for any packet sent and therefore no retransmission happens. Stream Control Transmission Protocol (SCTP) is another well-known protocol that is connection-oriented, for transmitting multiple streams of data simultaneously between two endpoints. The protocol provides the message-oriented feature of the User Datagram Protocol (UDP), while ensuring reliable, in-sequence transport of messages with congestion control like the Transmission Control Protocol (TCP). But even in case of SCTP, all the lost data packets that are sent via reliable-ordered stream are retransmitted, which may not be required in a variety of scenarios. For data packets transmitted over unreliable-unordered stream are, no ACK is sent by Rx and therefore no retransmission occurs. All the existing protocols discussed above lack the option to change packet semantics by the end application on the fly for individual fragments in flight for the same stream. For a particular stream, the parameters including maximum number of retransmissions permitted for all the packets transmitted over that stream are set beforehand during stream establishment and cannot be changed.

SUMMARY

Embodiments of the present disclosure present technological improvements as solutions to one or more of the above-mentioned technical problems recognized by the inventors in conventional systems. For example, in one embodiment, a processor implemented method of data transmission is provided. The method includes acquiring, by a transmitter executed by one or more hardware processors, a target frame as input data. Further, the transmitter transmits a plurality of data packets of the target frame to a receiver executed by the one or more hardware processors, wherein each of the plurality of data packets is transmitted in one of a reliable mode and a best effort mode, wherein for each of the plurality of data packets transmitted in the reliable mode the transmitter awaits an acknowledgement (ACK) from the receiver for a current value of a dynamically adaptive timeout period, while continuing transmission of subsequent packets in the best effort mode in parallel. Further, the transmitter identifies one or more of the data packets transmitted in the reliable mode as a lost packet, based on a reception status of the ACK. Further, the transmitter dynamically determines whether the one or more data packets identified as lost packet is to be retransmitted. Dynamically determining whether the one or more data packets identified as lost packet is to be retransmitted includes the following steps. In this process, the transmitter identifies value of a NRTx header field (Maximum Number of Retransmissions) associated with each of the lost packets as one of a zero value and a non-zero value, which signifies the number of retransmissions requested for the particular data packet by the end-application. Further, the lost packet is retransmitted if the value of the associated NRTx header field is the non-zero value, wherein next transmitted packet is retransmission of the lost packet. If the value of the associated NRTx header field is a zero value, then the transmitter performs no retransmission of the lost packet, wherein the next transmitted packet is an original packet.

In an embodiment, the method includes recalculating value of the dynamically adaptive timeout period, by the transmitter, to generate an updated value of the dynamically adaptive timeout period, based on an instantaneous channel condition determined in terms of the ACK reception status, to minimize ACK loss caused due to a channel delay indicated by the instantaneous channel condition.

In another embodiment, the method includes applying the updated value of the dynamically adaptive timeout period to next retransmission of the lost packet if the NRTx value is non-zero, and to next original packet transmitted reliably if the NRTx value is zero.

In another embodiment of the method, the reception status of the ACK indicates one of a) the ACK has been received within a defined timeout period, b) the ACK has not been received within the defined timeout period and c) number of successive successful reception of ACKs.

In another embodiment of the method, for the lost packet the reception status indicates that the ACK was not received within the current value of the dynamically adaptive timeout period.

In another embodiment of the method, for each of the plurality of data packets for which the reception status of ACK indicates that the ACK has been received within the defined timeout period, next transmitted packet is an original packet irrespective of value of the NRTx header field of a current data packet.

In another embodiment of the method, the target frame is one of a basic type and a delta type.

In another embodiment of the method, maximum number of retransmissions permitted for each of the lost packets is equal to the non-zero value in the associated NRTx header field.

In yet another embodiment, a system is provided. The system includes one or more hardware processors, a communication interface, and a memory storing a plurality of instructions. The plurality of instructions causes a transmitter executed by the one or more hardware processors to acquire a target frame as input data. Further, the transmitter transmits a plurality of data packets of the target frame to a receiver executed by the one or more hardware processors, wherein each of the plurality of data packets is transmitted in one of a reliable mode and a best effort mode, wherein for each of the plurality of data packets transmitted in the reliable mode the transmitter awaits an acknowledgement (ACK) from the receiver for a current value of a dynamically adaptive timeout period, while continuing transmission of subsequent packets in the best effort mode in parallel. Further, the transmitter identifies one or more of the data packets transmitted in the reliable mode as a lost packet, based on a reception status of the ACK. Further, the transmitter dynamically determines whether the one or more data packets identified as the lost packet is to be retransmitted. Dynamically determining whether the one or more data packets identified as the lost packet is to be retransmitted includes the following steps. In this process, the transmitter identifies value of a NRTx header field associated with each of the lost packets as one of a zero value and a non-zero value, which signifies the number of retransmissions requested for the particular data packet by the end-application. Further, the lost packet is retransmitted if the value of the associated NRTx header field is the non-zero value, wherein next transmitted packet is retransmission of the lost packet. If the value of the associated NRTx header field is a zero value, then the transmitter performs no retransmission of the lost packet, wherein the next transmitted packet is an original packet.

In yet another embodiment, the transmitter is configured to recalculate value of the dynamically adaptive timeout period, to generate an updated value of the dynamically adaptive timeout period, based on an instantaneous channel condition determined in terms of the ACK reception status, to minimize ACK loss caused due to a channel delay indicated by the instantaneous channel condition.

In yet another embodiment, the transmitter is configured to apply the updated value of the dynamically adaptive timeout period to next retransmission of the lost packet if the NRTx value is non-zero, and to next original packet transmitted reliably if the NRTx value is zero.

In yet another embodiment of the system, the reception status of the ACK indicates one of a) the ACK has been received within a defined timeout period, b) the ACK has not been received within the defined timeout period and c) number of successive successful reception of ACKs.

In yet another embodiment of the system, for the lost packet the reception status indicates that the ACK was not received within the current value of the dynamically adaptive timeout period.

In yet another embodiment of the system, for each of the plurality of data packets for which the reception status of ACK indicates that the ACK has been received within the defined timeout period, next transmitted packet is an original packet irrespective of value of the NRTx header field of a current data packet.

In yet another embodiment of the system, the target frame is one of a basic type and a delta type.

In yet another embodiment of the system, maximum number of retransmissions permitted for each of the lost packets is equal to the non-zero value in the associated NRTx header field.

In yet another aspect, a non-transitory computer readable medium is provided. The non-transitory computer readable medium includes a plurality of instructions, which when executed, cause a transmitter executed by one or more hardware processors to acquire a target frame as input data. Further, the transmitter transmits a plurality of data packets of the target frame to a receiver executed by the one or more hardware processors, wherein each of the plurality of data packets is transmitted in one of a reliable mode and a best effort mode, wherein for each of the plurality of data packets transmitted in the reliable mode the transmitter awaits an acknowledgement (ACK) from the receiver for a current value of a dynamically adaptive timeout period, while continuing transmission of subsequent packets in the best effort mode in parallel. Further, the transmitter identifies one or more of the data packets transmitted in the reliable mode as a lost packet, based on a reception status of the ACK. Further, the transmitter dynamically determines whether the one or more data packets identified as the lost packet is to be retransmitted. Dynamically determining whether the one or more data packets identified as the lost packet is to be retransmitted includes the following steps. In this process, the transmitter identifies value of a NRTx header field associated with each of the lost packets as one of a zero value and a non-zero value, which signifies the maximum number of retransmissions requested for the particular data packet by the end-application. Further, the lost packet is retransmitted if the value of the associated NRTx header field is the non-zero value, wherein next transmitted packet is retransmission of the lost packet. If the value of the associated NRTx header field is a zero value, then the transmitter performs no retransmission of the lost packet, wherein the next transmitted packet is an original packet.

In an embodiment, the non-transitory computer readable medium causes the transmitter to recalculate value of the dynamically adaptive timeout period, to generate an updated value of the dynamically adaptive timeout period, based on an instantaneous channel condition determined in terms of the ACK reception status, to minimize ACK loss caused due to a channel delay indicated by the instantaneous channel condition.

In another embodiment, the non-transitory computer readable medium causes the transmitter to apply the updated value of the dynamically adaptive timeout period to next retransmission of the lost packet if the NRTx value is non-zero, and to next original packet transmitted reliably if the NRTx value is zero.

In yet another embodiment of the non-transitory computer readable medium, the reception status of the ACK indicates one of a) the ACK has been received within a defined timeout period, b) the ACK has not been received within the defined timeout period and c) number of successive successful reception of ACKs.

In yet another embodiment of the non-transitory computer readable medium, for the lost packet the reception status indicates that the ACK was not received within the current value of the dynamically adaptive timeout period.

In yet another embodiment of the non-transitory computer readable medium, for each of the plurality of data packets for which the reception status of ACK indicates that the ACK has been received within the defined timeout period, next transmitted packet is an original packet irrespective of value of the NRTx header field of a current data packet.

In yet another embodiment of the non-transitory computer readable medium, the target frame is one of a basic type and a delta type.

In yet another embodiment of the non-transitory computer readable medium, maximum number of retransmissions permitted for each of the lost packets is equal to the non-zero value in the associated NRTx header field.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
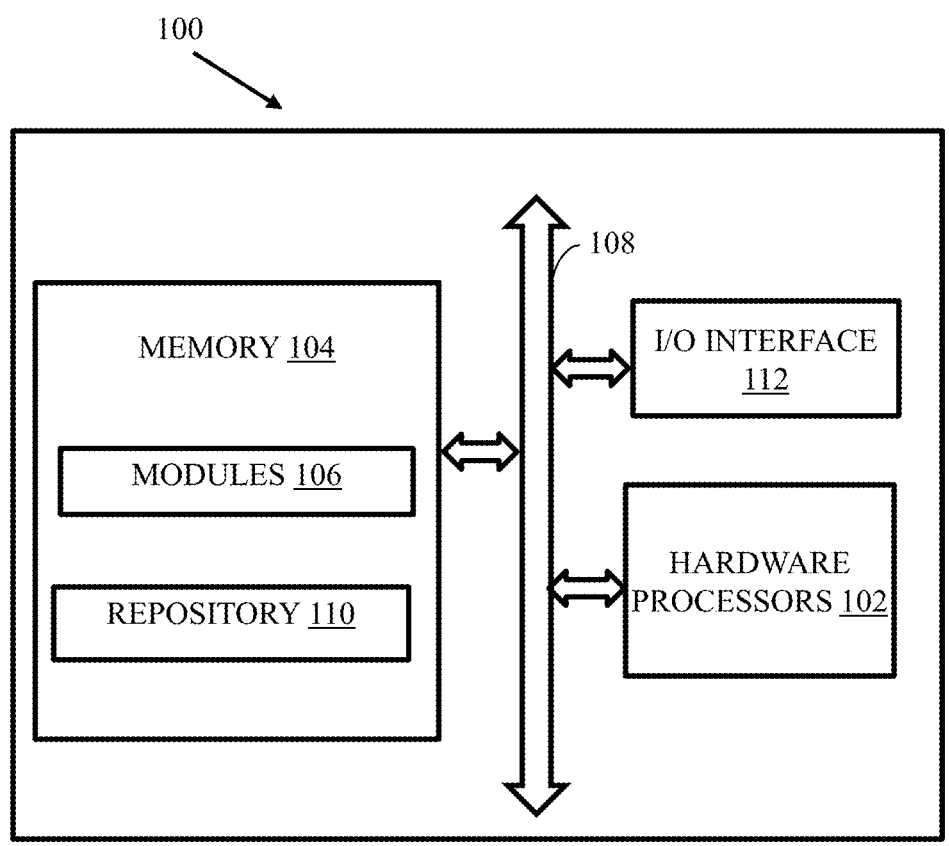
FIG. 1 illustrates an exemplary system (transmitter) for data transmission, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

A very well-known protocol for streaming is MPEG-DASH (Dynamic Adaptive Streaming over HTTP) that uses HTTP (Hypertext Transfer Protocol). HTTP works on the top of TCP (Transmission Control Protocol) protocol. TCP transmits all the data packets in reliable mode for which the transmitter awaits Acknowledgement (ACK) for each packet sent. If ACK is not received within a Timeout period, the lost packet is retransmitted and it adapts the ACK timeout period using exponential backoff. Hence TCP does not provide any option to not retransmit an individual lost packet sent reliably. Another extensively used protocol for delivering audio and video over IP networks is RTP (Real-time Transport Protocol). But, RTP uses UDP (User Datagram Protocol) as underlying transport protocol hence transmits all the packets by a Best Effort mode of delivery. But RTP uses RTCP (Real-Time Transport Control Protocol) protocol to control the transmission and the quality of data being transmitted. Hence all the packets in RTP with RTCP are sent via unreliable mode, therefore no ACK is received for any packet sent and therefore no retransmission happens. Stream Control Transmission Protocol (SCTP) is another well-known protocol that is connection-oriented, for transmitting multiple streams of data simultaneously between two endpoints. The protocol provides the message-oriented feature of the User Datagram Protocol (UDP), while ensuring reliable, in-sequence transport of messages with congestion control like the Transmission Control Protocol (TCP). But even in case of SCTP, all the lost data packets that are sent via reliable-ordered stream are retransmitted, which may not be required in a variety of scenarios. For data packets transmitted over unreliable-unordered stream are, no ACK is sent by Rx and therefore no retransmission occurs. All the existing protocols discussed above lack the option to change packet semantics by the end application on the fly for individual fragments in flight for the same stream. For a particular stream, the parameters including maximum number of retransmissions permitted for all the packets transmitted over that stream are set beforehand during stream establishment and cannot be changed.

In order to address these challenges, a method and system for context-based retransmission of lost packets have been provided. The method includes acquiring, by a transmitter executed by one or more hardware processors, a target frame as input data. Further, the transmitter transmits a plurality of data packets of the target frame to a receiver executed by the one or more hardware processors, wherein each of the plurality of data packets is transmitted in one of a reliable mode and a best effort mode, wherein for each of the plurality of data packets transmitted in the reliable mode the transmitter awaits an acknowledgement (ACK) from the receiver for a current value of a dynamically adaptive timeout period, while continuing transmission of subsequent packets in the best effort mode in parallel. Further, the transmitter identifies one or more of the data packets transmitted in the reliable mode as a lost packet, based on a reception status of the ACK. Further, the transmitter dynamically determines whether the one or more data packets identified as the lost packet is to be retransmitted. Dynamically determining whether the one or more data packets identified as the lost packet is to be retransmitted includes the following steps. In this process, the transmitter identifies value of a NRTx header field associated with each of the lost packets as one of a zero value and a non-zero value. Further, the lost packet is retransmitted if the value of the associated NRTx header field is the non-zero value, wherein next transmitted packet is retransmission of the lost packet. If the value of the associated NRTx header field is a zero value, then the transmitter performs no retransmission of the lost packet, wherein the next transmitted packet is an original packet. The method includes recalculating value of the dynamically adaptive timeout period, by the transmitter, to generate an updated value of the dynamically adaptive timeout period, based on an instantaneous channel condition determined in terms of the ACK reception status, to minimize ACK loss caused due to a channel delay indicated by the instantaneous channel condition. The method includes applying the updated value of the dynamically adaptive timeout period to next retransmission of the lost packet if the NRTx value is non-zero, and to next original packet transmitted reliably if the NRTx value is zero.

Referring now to the drawings, and more particularly to FIG. 1 through FIG. 4G, where similar reference characters denote corresponding features consistently throughout the figures, there are shown preferred embodiments and these embodiments are described in the context of the following exemplary system and/or method.

FIG. 1 illustrates an exemplary system (transmitter) for data transmission, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of data transmission, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the data transmission.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagrams in FIG. 2. In an embodiment, the data transmission approach used by the system 100 may be developed over a Constraint Application Protocol (CoAP) or any other similar suitable protocols.

Figure 2:
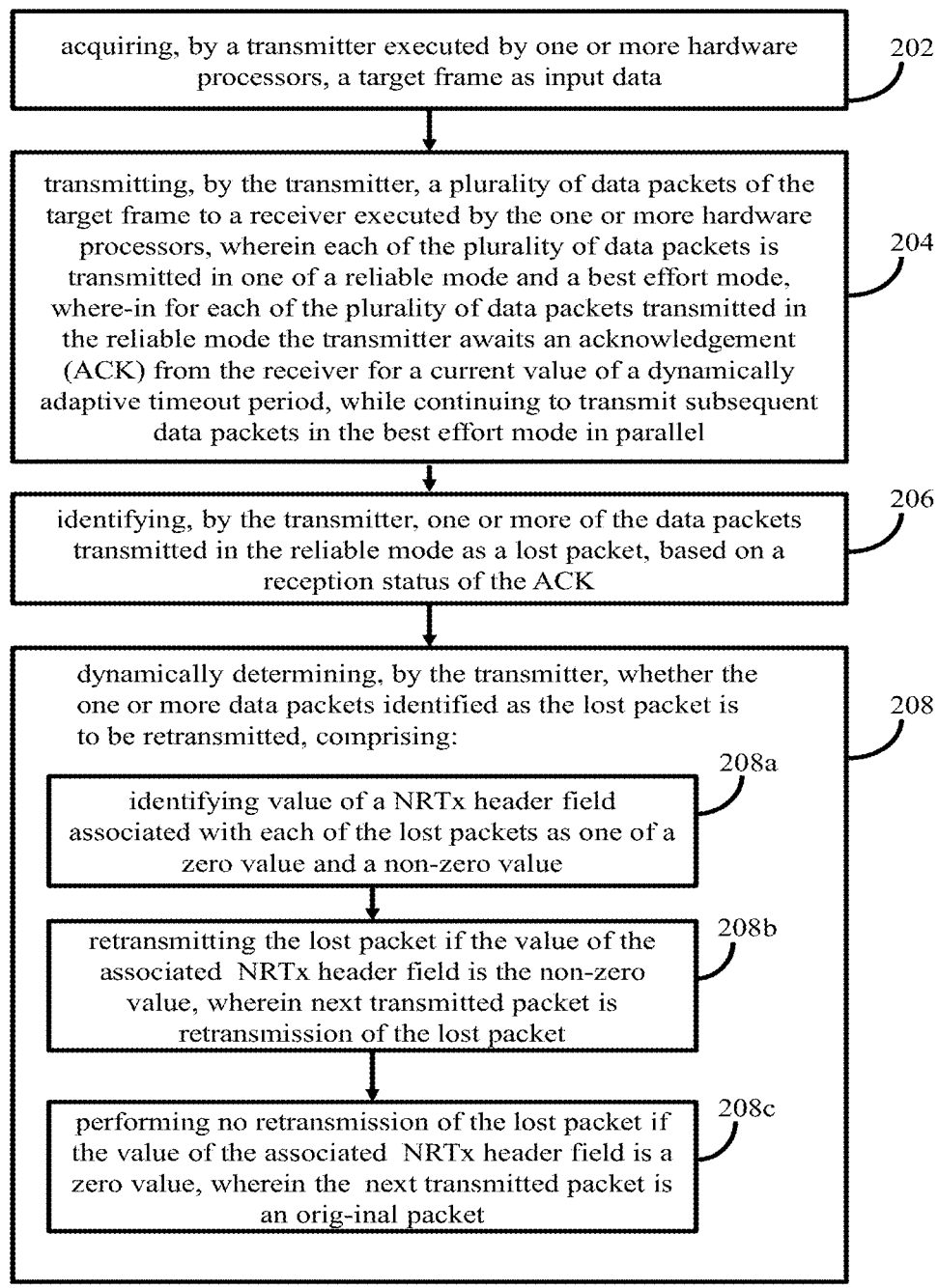
FIG. 2 is a flow diagram depicting steps involved in the process of context-based retransmission of lost packets, by the transmitter of FIG. 1, according to some embodiments of the present disclosure.
Figure 3A:
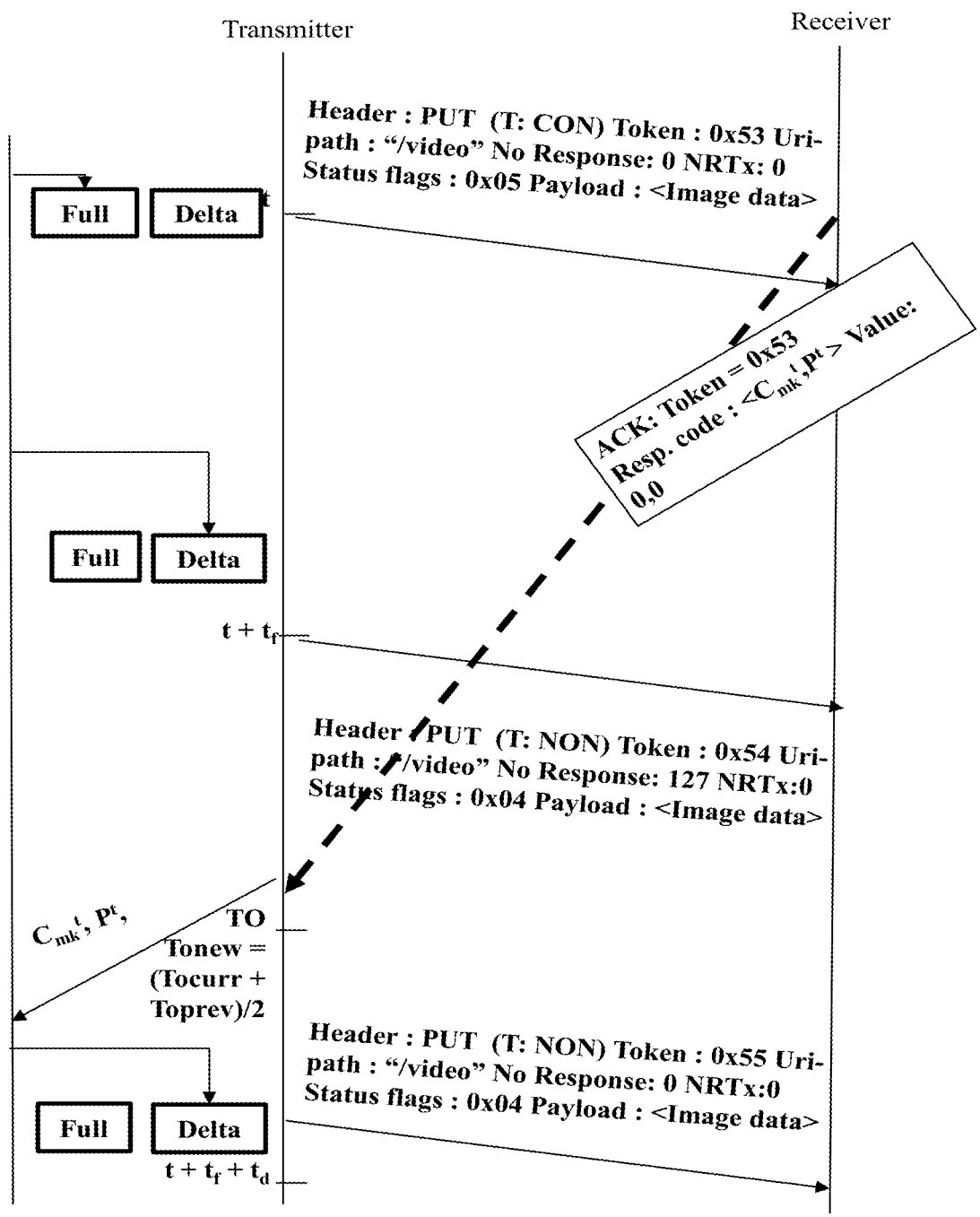
FIGS. 3A through 3E (collectively referred to as FIG. 3) depict example timing diagrams of the process of context-based retransmission of lost packets representing transmitter-receiver protocol semantics, by the system of FIG. 1, according to some embodiments of the present disclosure.
Figure 3B:
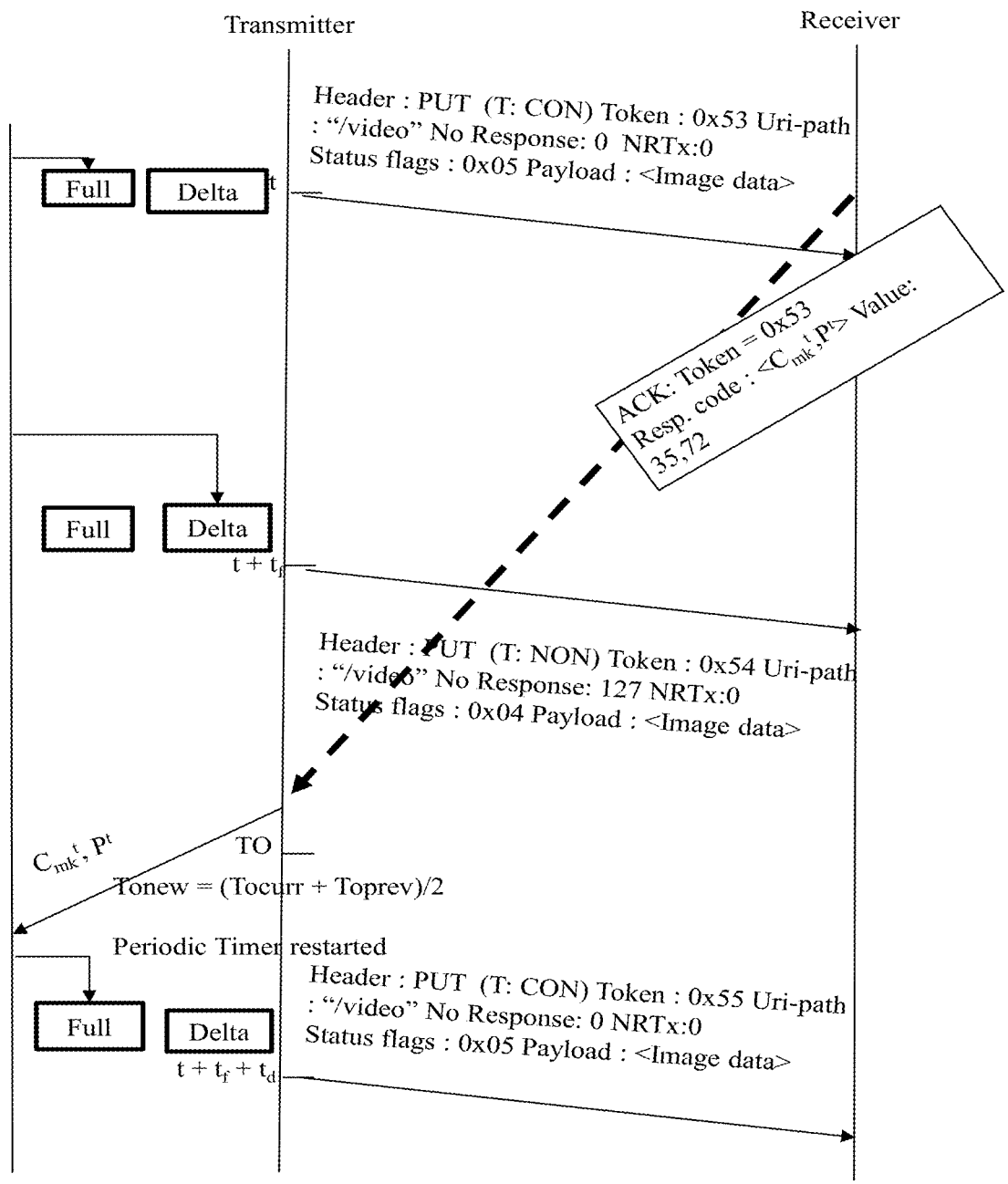
Figure 3C:
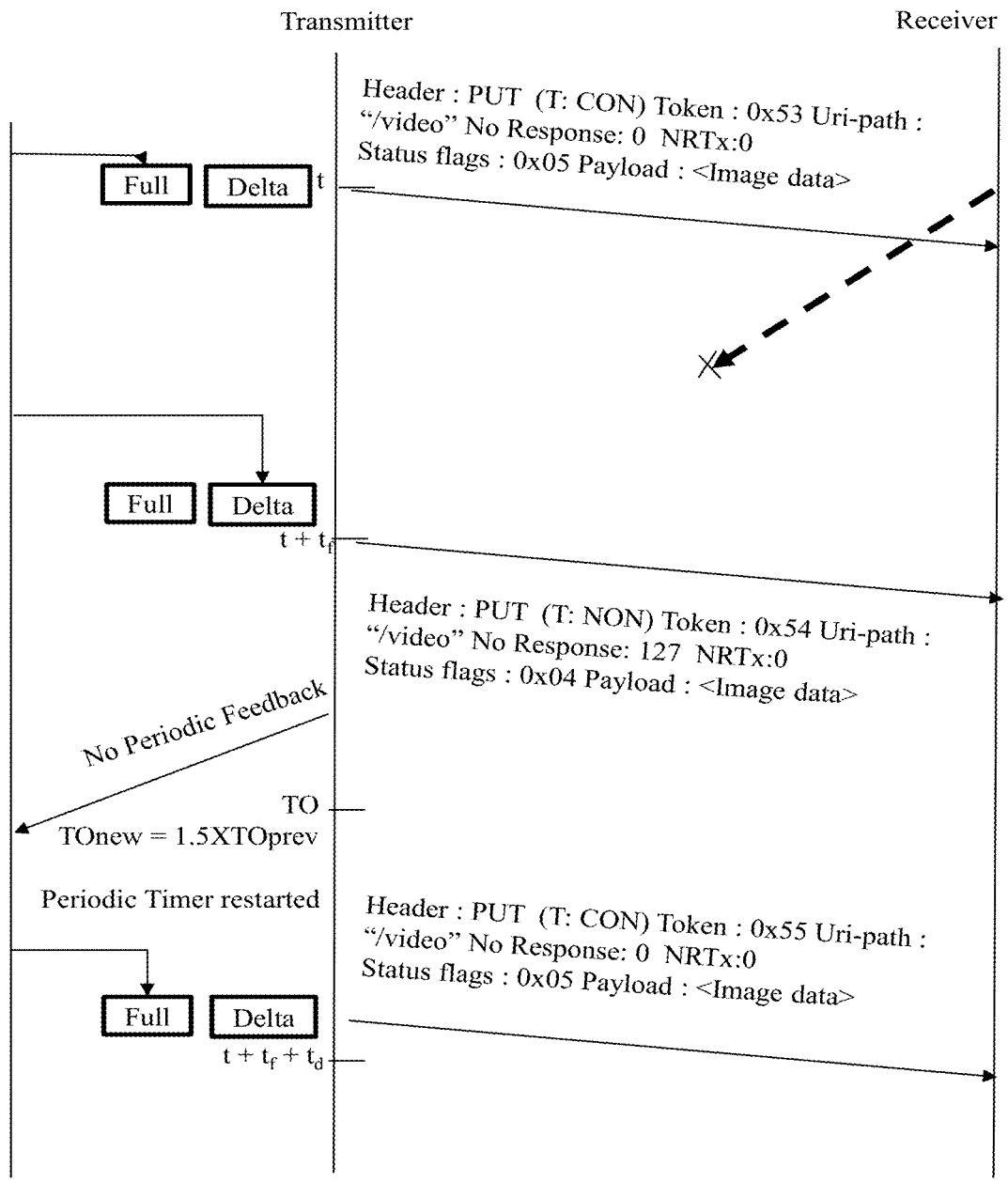
Figure 3D:
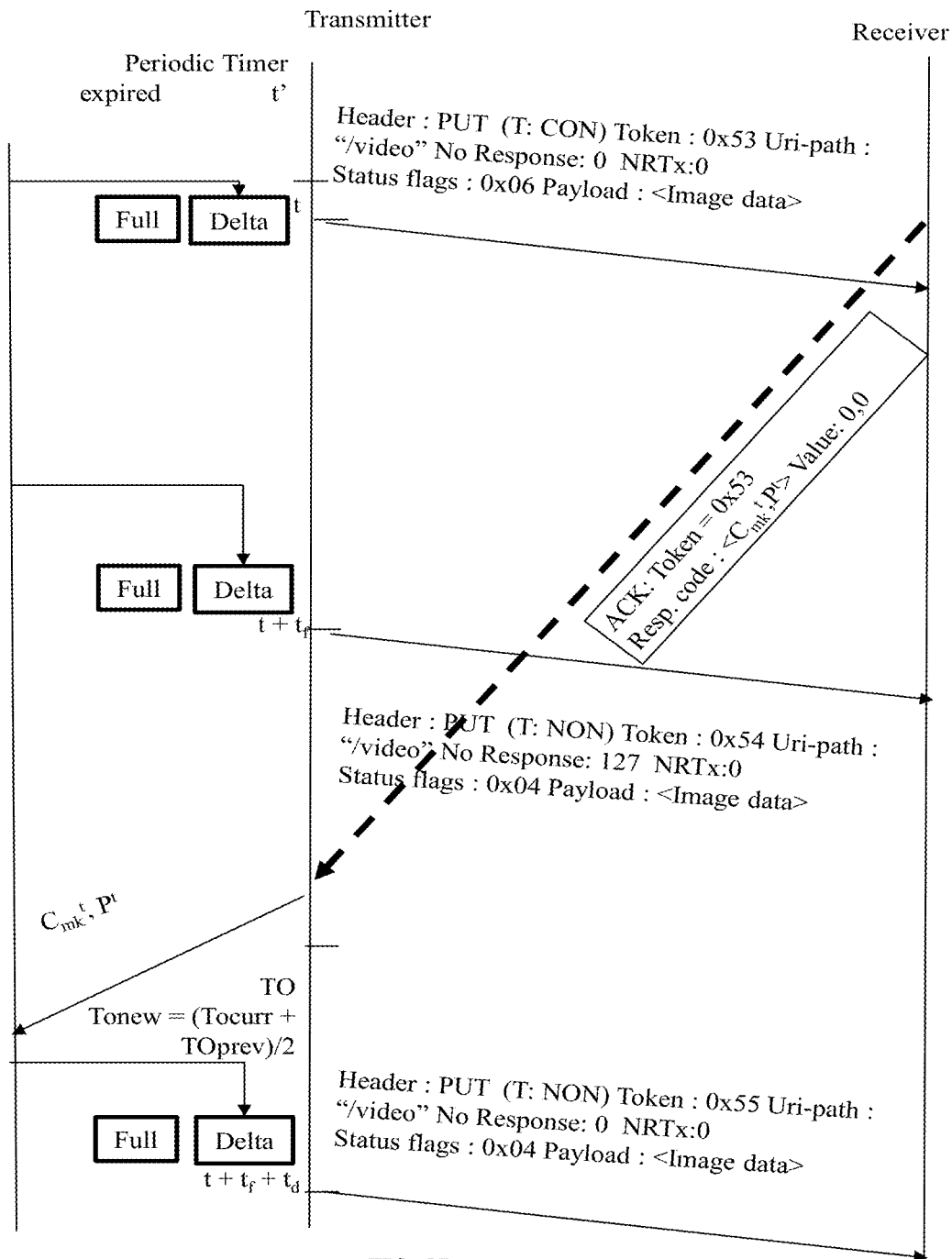
Figure 3E:
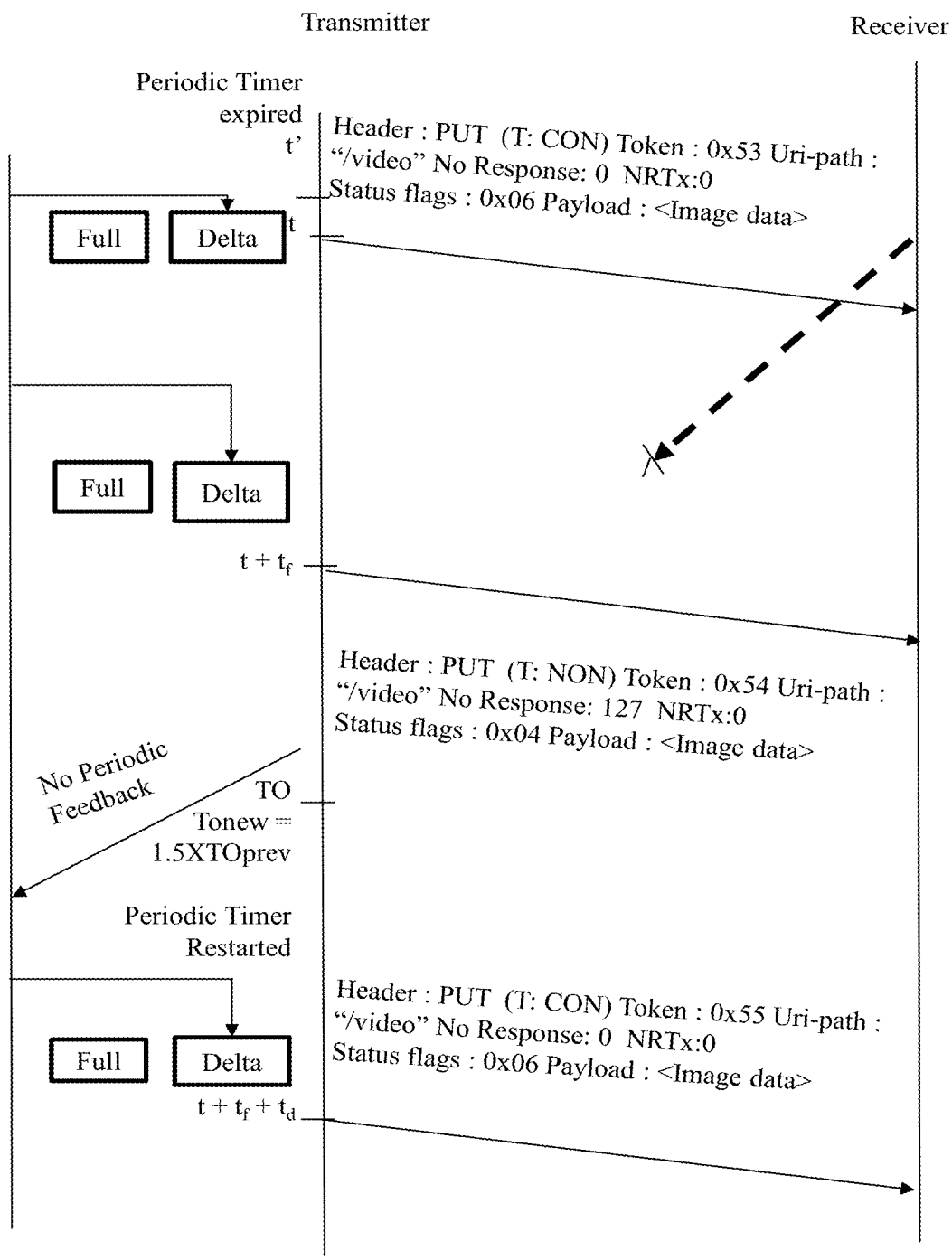

FIG. 2 is a flow diagram depicting steps involved in the process of context-based retransmission of lost packets, by the transmitter of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of method 200 in FIG. 2, a transmitter executed by the one or more hardware processors 102 acquires a target frame as input data. The target frame is an image of one or more objects, that is to be transmitted to a receiver executed by the one or more hardware processors 102, as part of a video transmission. The target frame is one of a basic type and a delta type. In the basic frame, a full JPEG encoded frame is transmitted, whereas a delta frame includes only a plurality of foreground pixels indicating changes in the current frame compared to previous frames.

At step 204 of the method 200, the transmitter transmits a plurality of data packets of the target frame to the receiver, wherein each of the plurality of data packets is transmitted in one of a reliable mode and a best effort mode. For each of the plurality of data packets transmitted in the reliable mode, the transmitter awaits an acknowledgement (ACK) from the receiver, while continuing transmission of subsequent packets in the best effort mode in parallel. The receiver transmits the ACK separately for each of the data packets transmitted in the reliable mode. If the ACK is not obtained for any of the data packets transmitted in the reliable mode within a dynamically adaptive timeout period (i.e. reception status of the ACK), at step 206 of the method 200, the transmitter identifies the data packet as a lost packet. The reception status of the ACK indicates one of a) the ACK has been received within the dynamically adaptive timeout period, b) the ACK has not been received within the dynamically adaptive timeout period, and c) number of successive successful reception of ACKs. For the lost packet the reception status indicates that the ACK was not received within the current value of the dynamically adaptive timeout period. For each of the plurality of data packets for which the reception status of ACK indicates that the ACK has been received within the defined timeout period, the data packet is not considered lost, and hence next transmitted packet is an original packet irrespective of value of the NRTx header field of a current data packet. The NRTx (Maximum Number of Retransmissions) field in protocol header is used to limit the maximum number of retransmissions permitted for an individual data packet. This header field can be applied to any underlying protocol to serve the same purpose. The NRTx header field is introduced as a header option in the protocol used, for example, in the CoAP protocol.

In an embodiment, value of the dynamically adaptive timeout period is recalculated by the transmitter to generate an updated value of the dynamically adaptive timeout period, based on an instantaneous channel condition determined in terms of the ACK reception status, to minimize ACK loss caused due to a channel delay indicated by the instantaneous channel condition. In another embodiment, every time the value of the dynamically adaptive timeout period is updated, the transmitter applies the updated value to next retransmission of the lost packet if the NRTx value is non-zero, and to next original packet transmitted reliably if the NRTx value is zero. In an embodiment, an encoder of the transmitter determines the instantaneous channel condition based on a periodic feedback from an underlying protocol which, at a given time t second, indicates a cumulative error rate (conk) and a predominant error rate ($P^r$) for an interval k, wherein value of k may vary based on application. If $C_t^{mk}$ exceeds a certain threshold it indicates degradation in receiver side video quality to an extent that will hamper Quality of Experience (QoE) of the user(s). To tackle this, the transmitter switches to basic mode and transmits a full JPEG frame. This prevents the propagational effect of loss to the future frames. If the value of $C_t^{mk}$ is within a tolerable threshold, the transmitter continues transmitting delta frames. Also, after sending a full frame to compensate for the reported degradation, the transmitter switches to delta mode where it transmits delta frames. However, the protocol also reports if a critical part of information contents in the full frame has been lost such that the loss is beyond compensation by a receiver logic, then the transmitter considers the current frame as dropped, and sends the next frame as a full frame and remains in basic mode. Also, since the full frames are of much larger size, the frame rate is halved in basic mode. As soon as delta mode is triggered, the framerate is restored back. Thus, the effective frame rate is adapted within the bounds of the given frame rate.

The recalculation of the dynamically adaptive timeout period involves the following steps. Whenever ACK loss occurs, it indicates possibility of channel congestion, hence the timeout period is increased for the next data packet using equation (1) till a max threshold $TO_{max}$ is reached.

$$T_{Onew} = 1.5 \cdot T_{Ocurr} \quad (1)$$

Similarly, if a certain number of consecutive ACKs are received (wherein value of the certain number of consecutive ACKs depends on application), then value of the dynamically adaptive timeout period is reduced as per equation (2), which allows to factor in improving channel conditions.

$$T_{Onew} = \frac{T_{Ocurr} + T_{Oprev}}{2}, \quad (2)$$

where, $T_{Ocurr}$ and $T_{Oprev}$ are the dynamically adaptive timeout period values for current and previous data packets.

Further, at step 208 of the method 200, the transmitter dynamically determines whether the one or more data packets identified as the lost packet is to be retransmitted or not. Steps involved in the process of dynamically determining whether or not to retransmit each of the lost packets are depicted in steps 208a through 208c. At step 208a, the transmitter identifies value of a NRTx header field associated with each of the lost packets as one of a zero value and a non-zero value. Further, at step 208b, the transmitter retransmits the lost packet if the value of the associated NRTx header field is the non-zero value, wherein next transmitted packet is retransmission of the lost packet. If the value of the associated NRTx header field is a zero value, then at step 208c the transmitter performs no retransmission of the lost packet, wherein the next transmitted packet is an original packet. The value of the NRTx header field associated with each of the reliable data packets transmitted is used to control retransmission of packets, such that the zero value of the NRTx header field for a data packet indicates that the packet is not to be retransmitted and the non-zero value indicates that the packet is to be retransmitted. The non-zero value of the NRTx header field also indicates maximum number of times the data packet can be retransmitted. For example, if the non-zero value of the NRTx header field is 1, then the data packet is retransmitted only once (if identified as lost packet). If the retransmitted packet also is lost, then the transmitter does not further retransmit the data packet. However, if the non-zero value of the NRTx header field is 2, then if the first retransmitted packet is lost, the transmitter may retransmit the data packet once again, i.e. two retransmissions in total. In this manner, the context-based retransmission of data packets is achieved, where the context is in terms of whether or not to retransmit the data packets, as indicated by the value of the associated NRTx field. In an embodiment, the dynamically adaptive timeout period (also referred to as 'defined timeout period' or 'timeout period') as in the step 204 of method 200 is associated with an effect of the NRTx based retransmission, as the value of the NRTx determines whether an original data packet or a data packet for retransmission (i.e., of a data packet transmitted reliably, for which no ACK was received within the defined timeout period) is transmitted with the updated value of the dynamically adaptive timeout period, in next transmission. The example timing diagrams in FIG. 3 depict transmitter, receiver protocol semantics and how the encoder is tightly coupled with underlying protocol. FIG. 3 also depicts how the NRTx protocol header option is set to 0 for each data packet sent reliably. Here since the value of NRTx value is set to 0, even when ACK is not received within specified Timeout period, no retransmission of lost packet occurs. This helps in preventing unnecessary retransmissions to cater to the real-time performance of transmission system. FIG. 3 also depicts how based on reception status of ACK, the Timeout period is dynamically adapted and how the CON transmissions occur in a non-blocking fashion.

In an embodiment, the data packet transmissions performed by the transmitter are all non-blocking in nature, i.e., once a critical data packet is sent, the transmitter does not block sending next packets while waiting for arrival of ACK. The transmitter keeps sending the next non-critical packets in line till it is preempted by a time-out for the last data packet sent reliably for which ACK is still awaited. The receiver piggybacks error statistics with the ACK messages which is reported to the transmitter on reception of ACK. If ACK for a data packet is lost, then depending on the whether the data packet sent belonged to a full frame or a frame sent at periodic timer expiry, the transmitter sends the next frame in line as full frame or delta frame with a 'Periodic Timer Status flag' set respectively. This is done as both full frame and periodic feedbacks are critical in maintaining high end-user QoE.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of context-based retransmission of data packets in video streaming systems. The embodiment, thus provides a mechanism of determining transmitted packets as lost packets based on reception status of acknowledgement within a dynamically configurable timeout period, which maybe recalculated based on instantaneous channel conditions. Moreover, the embodiments herein further provide a mechanism of determining whether or not to retransmit a lost packet, based on value of an associated NRTx header field.

Experimental Data

For the experiments, the system 100 was implemented in C++ using OpenCV and Boost libraries. It was designed to capture raw frames and entire encoding happens in proprietary software, without using any special hardware accelerator or encoding in camera firmware. The system 100 was built on Ubuntu 20.04 on a standard Intel Core i5 machine. The transmitter side of the communication network was ported to R-Pi3 which was housed in a telerobotic car designed for remote teleoperation. The system 100 was designed to live stream both stored videos and live camera feed to a receiver. A parallel WebRTC implementation on Java Script was created with a media channel for video streaming and data channel for exchanging kinematic controls and feedbacks. The WebRTC system was also designed to transmit both stored video and live camera feed.

Figure 4A:
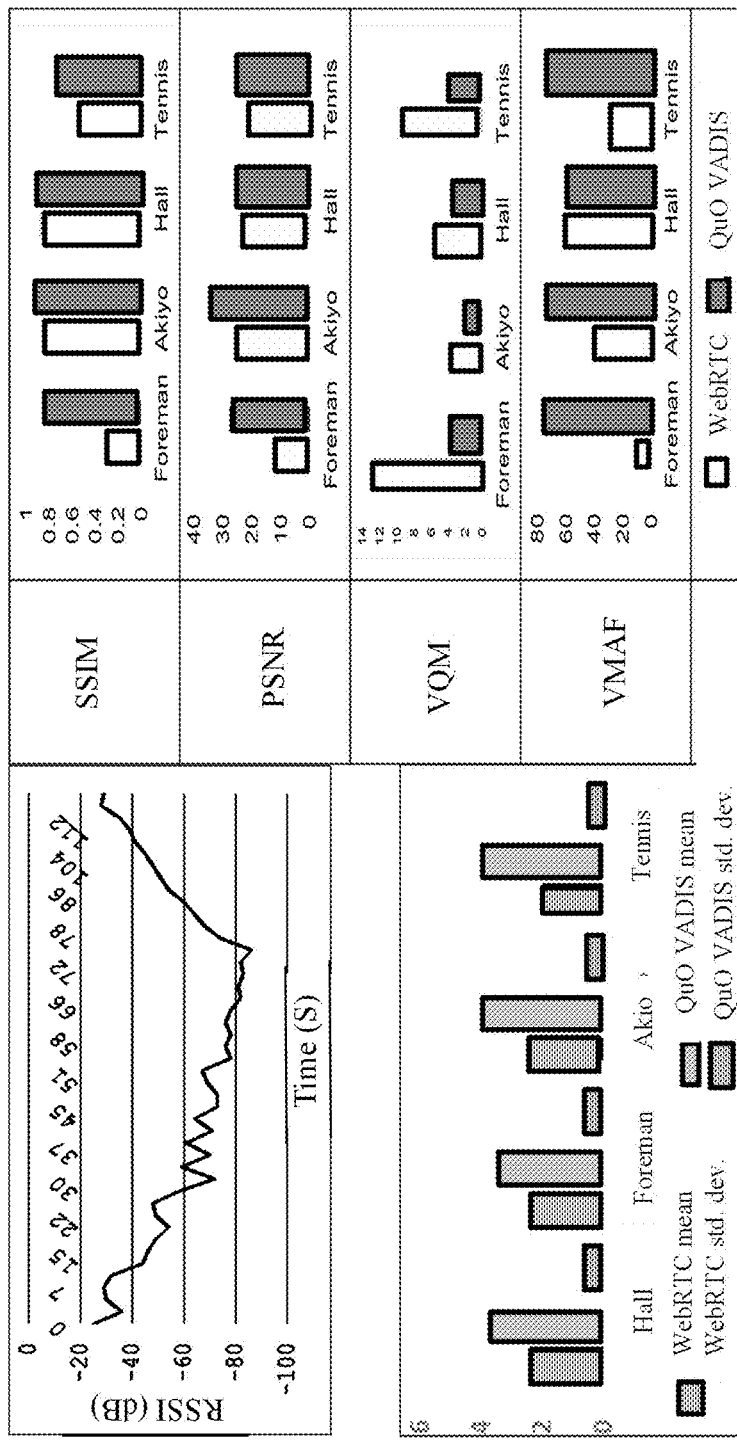
FIGS. 4A through 4G depict experimental data associated with an example implementation of the system of FIG. 1, according to some embodiments of the present disclosure.

Initially a full referential quality measurement was performed for stored video sequences taken from a source. To ensure to cover different test cases comprising of static FoV, dynamic FoV, high motion, low motion, etc., Akiyo, Hall, Foreman and Tennis sequences were selected and rescaled all to 640×480 resolution. Target of this experiment was to observe the effect of only the last-mile impairment. So, both transmitter and receiver were kept in the same network and the access point was moved 'far from—and—near to' the test set up in a U-shaped trajectory. This resulted in an RSSI response as depicted in FIG. 4A.

To enable full referential comparison (SSIM, PSNR, VQM, VMAF) a stream recording mechanism was created in the receiver and transmitter pages in the WebRTC system. For the transmitter, individual transmitted and received frames were obtained. For WebRTC the samples were all WebM encoded, and for the transmitter, raw frames were supplied. Besides performing full referential measurements, the experiments were also conducted in front of 20 subjects who could see both the transmission and reception and they were requested to scale the reception quality for each video for both WebRTC and the system 100. All subjects could see significant freezing for WebRTC much before the RSSI nears the bottom of the curve, which was found to be recovering long after actual recovery of RSSI. The reasons were loss of GoP synchronization and failure to agile reaction to the channel variations. But, the system 100 was found to be continuing steady performance and tried to regain lost frames through its zero overhead error concealment. There was momentary freeze around deep loss of RSSI. But due to its agile frame-by-frame operation, it regained quickly as soon as RSSI started to rise just above −70 decibels (dB). The efficacy is reflected in subjective and full referential results, as depicted in FIG. 4A.

The context-based retransmission with NRTx field being set to zero helps prevent unnecessary retransmissions, and therefore reduction in scene-to-screen latency is observed. At the same time, the non-blocking CON transmissions help improve transmission framerate. That helps improve the end-user QoE. The dynamic timeout adaptation in response to channel conditions helps minimize the ACK misses. Therefore the periodic feedbacks piggybacked in ACKs helps the transmitter to encode the video using QoE aware spatio-temporal bitrate encoding to satisfy channel bit budget. Additionally, the encoding is done so as to not add to channel congestion, therefore minimizes packet drop. The above factors along with a tightly coupled encoder and protocol helps improve end-user QoE measured in terms of subjective (MOS) and objective (SSIM, PSNR, VQM, VMAF) quality measure and scene-to-screen latency.

Figure 4B:
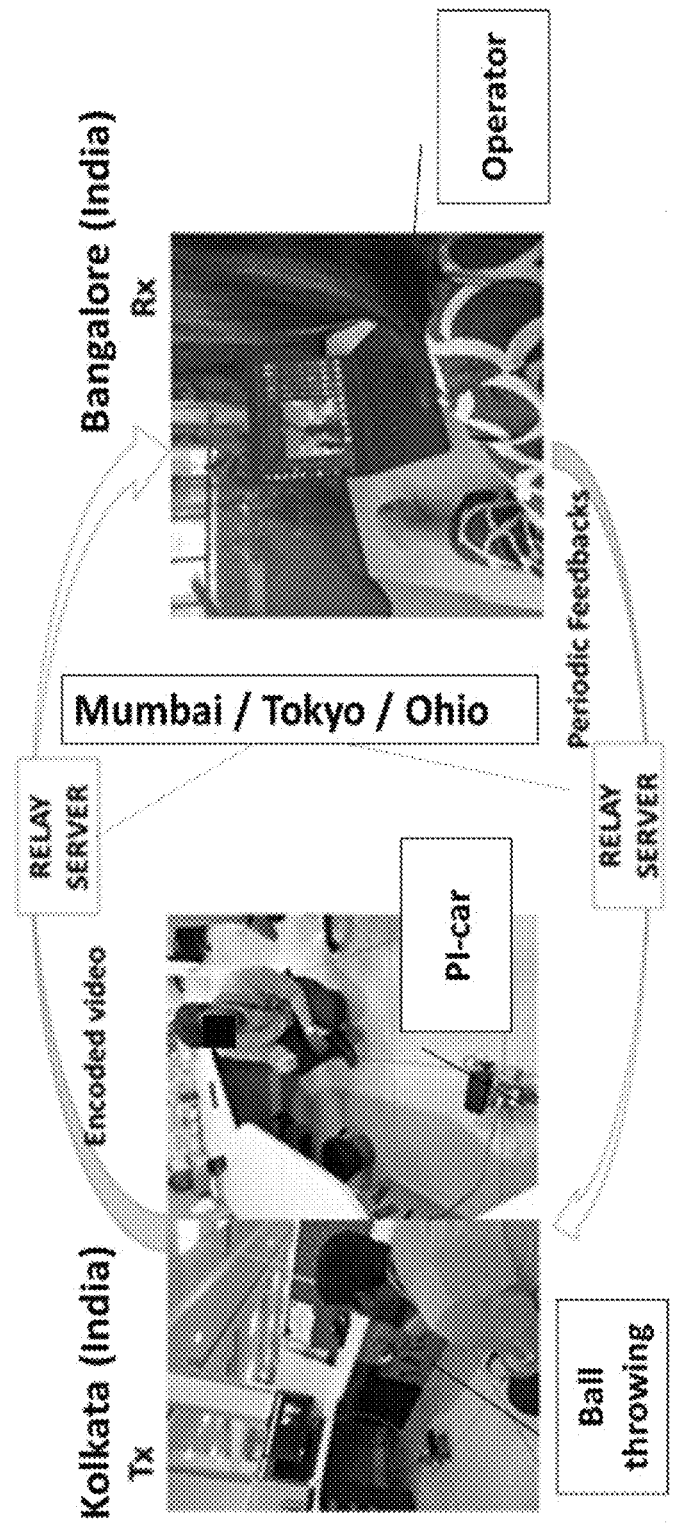
Figure 4C:
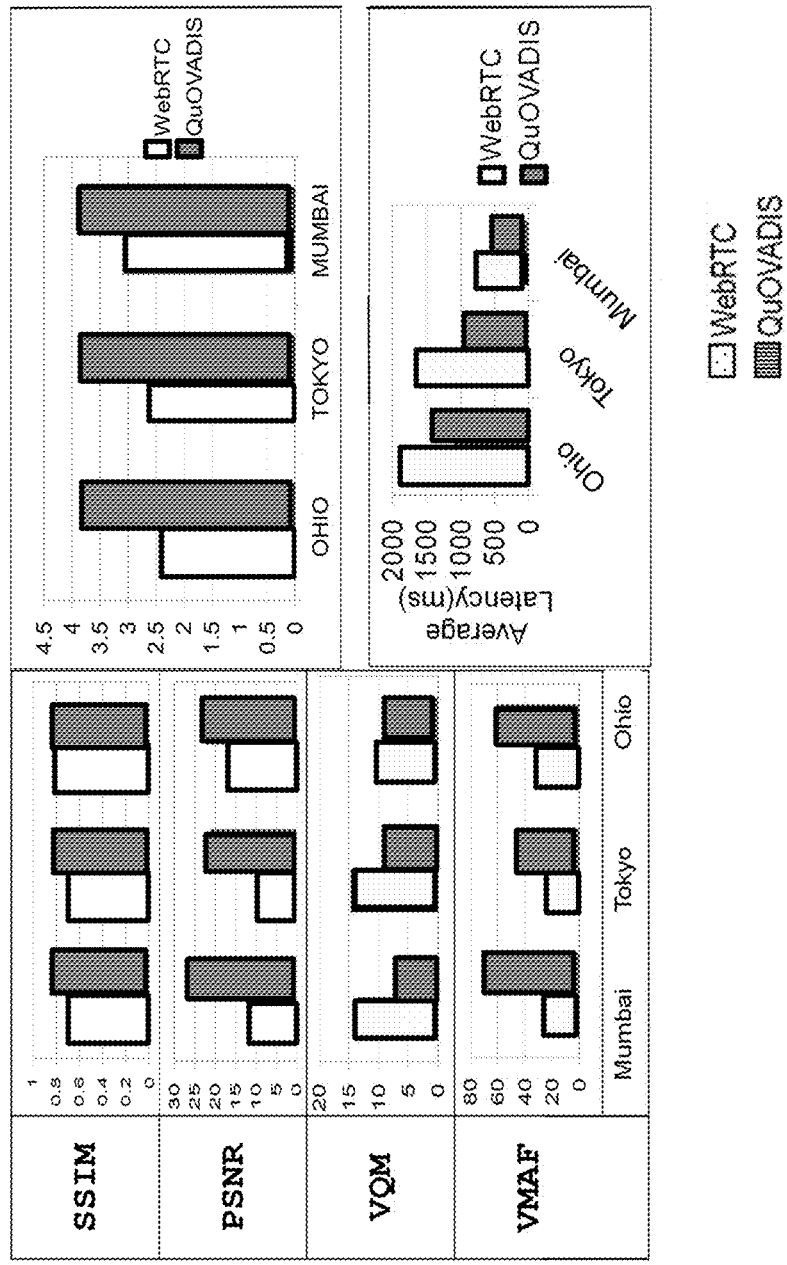
Figure 4D:
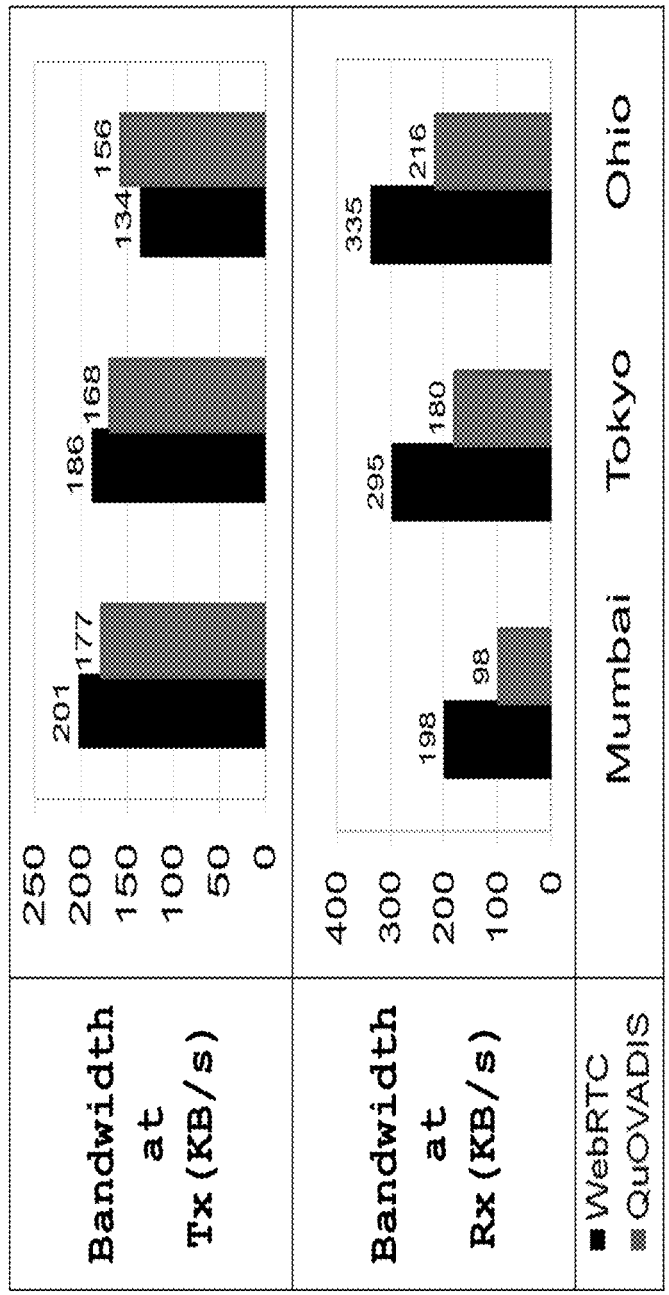

The system 100 was then deployed over a long-haul P2P setting. The transmitter on a Pi-car was put in a first location, i.e. Kolkata, India. An operator console was in a second location, i.e. Bangalore, India. Both units were put in private networks behind restrictive Network Address Translation (NATs) which did not allow hole punching. This ensured that WebRTC had to route through Traversal Using Relays around NAT (TURN) server. A UDP-based relay service also was created, co-located with the TURN server, for the system 100. The TURN and the relay servers were replicated in three different AWS instances in Mumbai (India), Tokyo (Japan), and Ohio (US-east). This way, performance under communication over Internet backbones running through different parts of the world could be tracked. The experiment was conducted in a real teleoperation scenario. A person in Kolkata threw a ball on the floor in a given trajectory, and the person in Bangalore had to track the ball by moving the Pi-car remotely, as depicted in FIG. 4B. While WebRTC system was equipped with data channel for this purpose, a special control console for operating while observing feeds was created using the system 100. The control commands were also relayed through the same relay server. Subjects were 20 users aged between 25-45 years. Each user was told to do the 'ball-tracking' exercise for 15 times in each sitting. Out of the 15 times the traffic was routed through Mumbai, Tokyo and Ohio for 5 times each. The experiment was repeated for the same subjects over a span of 5 days at different time of the day (morning, afternoon, evening). Each time the stream was recorded for full referential measures of the videos and the operators in Bangalore were told to mark the experience in a scale of 5. Wireshark was used to measure the live bandwidth consumption for each experiment. FIG. 4C show full referential and MOS results respectively. The MOS results had the additional consideration for ease of operation by only looking at the video feed from Kolkata. At-times the quality of the reception in WebRTC was extremely deteriorated leading to inability to do any kind of teleoperation. But such problems were much less in case of the system 100 where the quality degradation happened quite gracefully. This could be attributed to the tightly coupled encoder and protocol, that adaptively encodes the video in response to variations in channel conditions while upholding the end-user QoE. The ACK timeout adaptation in response to channel conditions helps reduce ACK misses assisting in adaptive bitrate encoding that ensures encoded video satisfies channel bit budget therefore minimizes frame drops. Along with upholding the end-user QoE, the system 100 was also bandwidth efficient as shown in FIG. 4D. Considering the figures of Bandwidth consumption at source, the bandwidth consumption consistently reduced from Mumbai-routed traffic to Ohio-routed traffic. This happened because the transmitter reduced the transmission rate in sync with degrading channel conditions from Mumbai to Ohio. This observation was made both for WebRTC and the system 100. But it was seen that the system 100 performed much better than WebRTC in bandwidth consumption in cases of routing via Mumbai and Tokyo. But for Ohio sequence, WebRTC consumed extremely low bandwidth as it pauses transmission for several seconds leading to long freezes in the streamed video deteriorating end-user experience. Hence only in case of routing via Ohio, WebRTC consumed less bandwidth than the system 100 at the expense of the quality of streamed video. Whereas, the bandwidth consumed at receiver to send feedbacks to the transmitter were found to be increasing in comparison between the cases in which the traffic was routed via Mumbai to when routed it via Ohio due to degrading channel conditions. Even then, the system 100 was shown to utilize much lesser channel bandwidth than WebRTC. The context based retransmission with NRTx field being set to zero helps prevent unnecessary retransmission therefore reducing BW consumption at source. At the same the tightly coupled adaptive bitrate encoder & protocol ensures that the encoded video satisfies channel bit budget.

Figure 4E:
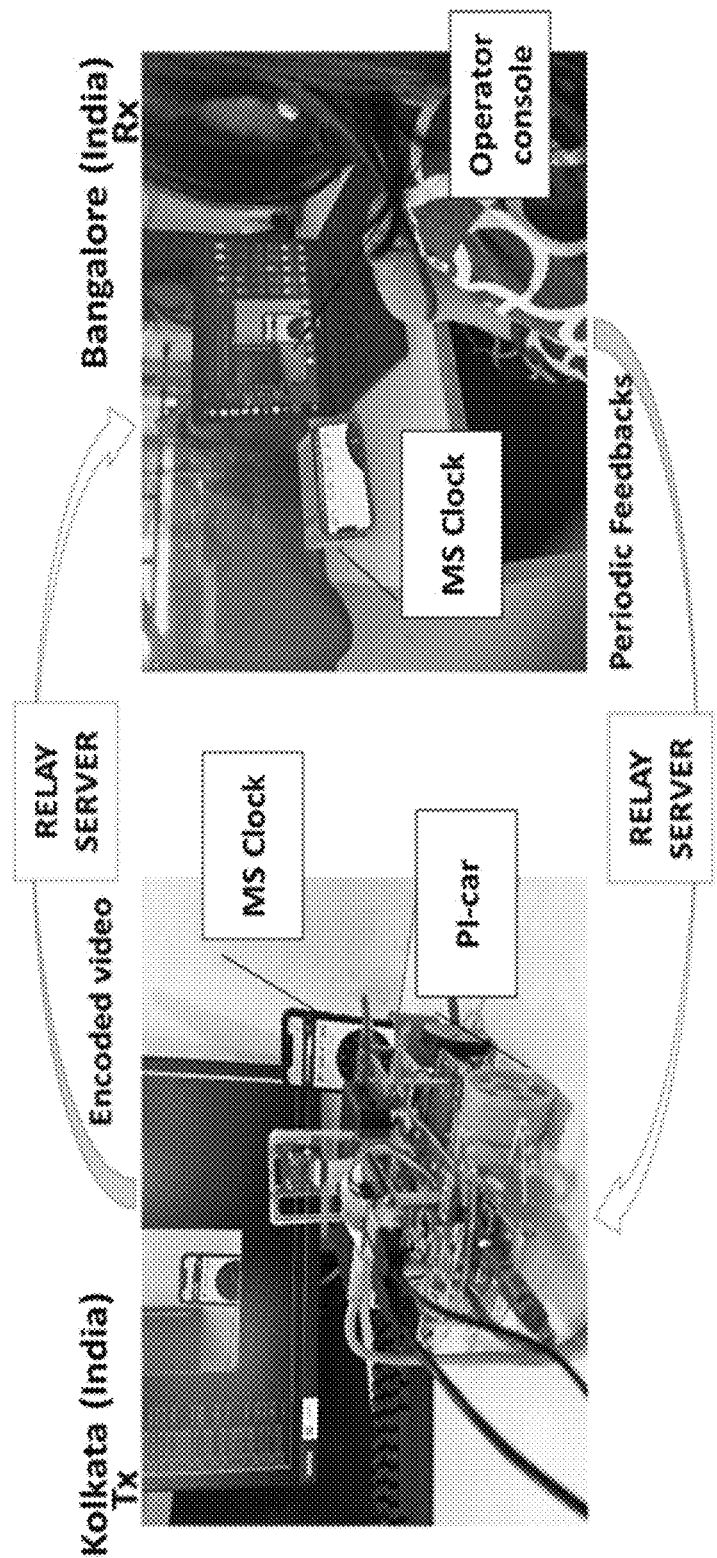
Figure 4F:
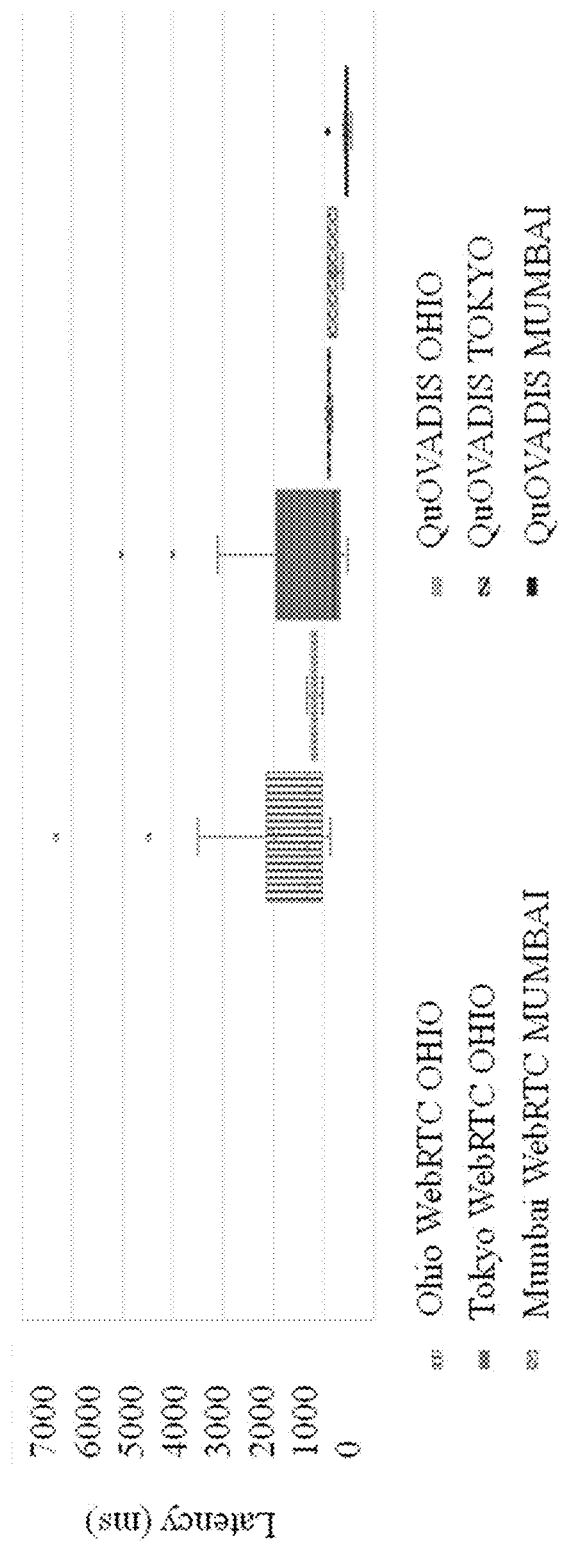

Motion-to-photon latency also was measured for traffic routed through the said routes. For this, two smart phones were time-synchronized with milliseconds clock in Bangalore and Kolkata. The view of clock was streamed from Kolkata. In Bangalore the mobile clock was set by the console and reception was recorded showing the time in both the screen and on the clock (FIG. 4E). Then the recorded video was paused at different instances for each recording and measured the time difference between the clock and screen-view for each paused screen. The latency variation along three the different routes is depicted in FIG. 4F.

Figure 4G:
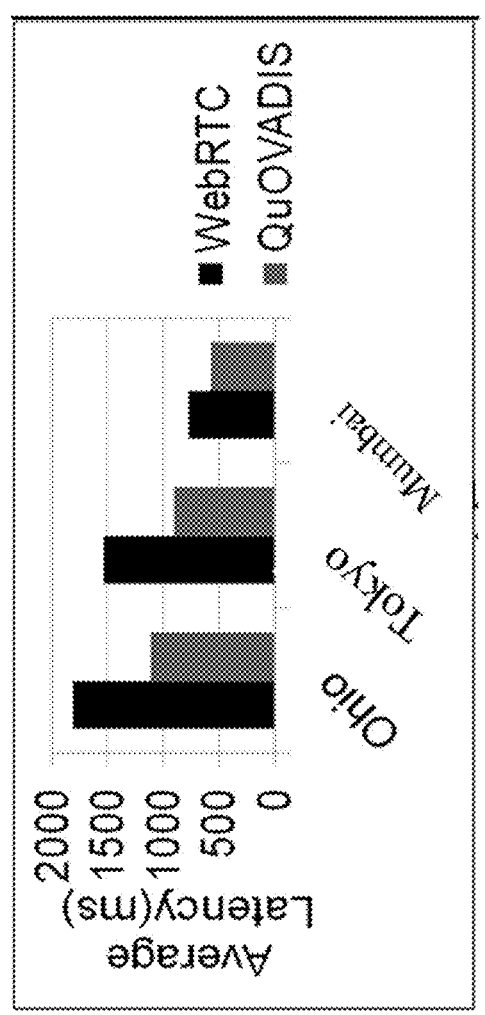

FIG. 4G shows the average latency observed in three different routes over the span of the experiment. As expected, larger latency variation was found in Ohio, followed by Tokyo and then Mumbai. Mumbai was the least as both peers were located in India. Ohio was the farthest. Though there were problems in synchronized operation due to the inherent photonic delay in the network, but regular freezing made the operation quite unrealizable in case of WebRTC. Several cycles of Ball throwing exercise were missed at Bangalore due to video freeze. This observation was very frequent for Ohio-routed traffic as WebRTC was unable to adapt with the latency variation leading to frequent freezes.

There was a momentary reduction in reception rate during overshooting of end-to-end latency in method 200, but it could quickly recover with recovery of the network owing to its frame by frame operation, whereas for WebRTC it took quite long time to recover from on-screen freezing despite recovery of the network. It was clearly seen that the method 200 outperforms WebRTC in latency performance measured in terms of scene-to-screen latency. The NRTx field being set to zero prevents unnecessary retransmission of the lost packets. This along with the non blocking CON transmission helps reduce the average scene-to-screen latency of the system 100.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of data transmission, comprising:
    acquiring, by a transmitter executed by one or more hardware processors, a target frame as input data;
    transmitting, by the transmitter, a plurality of data packets of the target frame to a receiver executed by the one or more hardware processors, wherein each of the plurality of data packets is transmitted in one of a reliable mode and a best effort mode, wherein for each of the plurality of data packets transmitted in the reliable mode the transmitter awaits an acknowledgement (ACK) from the receiver for a current value of a dynamically adaptive timeout period, while continuing transmission of subsequent packets in the best effort mode in parallel;
    identifying, by the transmitter, one or more of the data packets transmitted in the reliable mode as a lost packet, based on a reception status of the ACK; and
    dynamically determining, by the transmitter, whether the one or more data packets identified as the lost packet is to be retransmitted, comprising:
        identifying value of a NRTx (Maximum Number of Retransmissions) header field associated with each of the lost packets as one of a zero value and a non-zero value;
        retransmitting the lost packet if the value of the associated NRTx header field is the non-zero value, wherein next transmitted packet is retransmission of the lost packet; and
        performing no retransmission of the lost packet if the value of the associated NRTx header field is a zero value, wherein the next transmitted packet is an original packet.

2. The processor implemented method of claim 1, further comprising recalculating value of the dynamically adaptive timeout period, by the transmitter, to generate an updated value of the dynamically adaptive timeout period, based on an instantaneous channel condition determined in terms of the ACK reception status, to minimize ACK loss caused due to a channel delay indicated by the instantaneous channel condition.

3. The processor implemented method of claim 2, wherein the updated value of the dynamically adaptive timeout period is applied to next retransmission of the lost packet if the NRTx value is non-zero, and to next original packet transmitted reliably if the NRTx value is zero.

4. The processor implemented method of claim 1, wherein the reception status of the ACK indicates one of a) the ACK has been received within a defined timeout period, b) the ACK has not been received within the defined timeout period and c) number of successive successful reception of ACKs.

5. The processor implemented method of claim 4, wherein for the lost packet the reception status indicates that the ACK was not received within the current value of the dynamically adaptive timeout period.

6. The processor implemented method of claim 4, wherein for each of the plurality of data packets for which the reception status of ACK indicates that the ACK has been received within the defined timeout period, next transmitted packet is an original packet irrespective of value of the NRTx header field of a current data packet.

7. The processor implemented method of claim 1, wherein the target frame is one of a basic type and a delta type.

8. The processor implemented method of claim 1, wherein maximum number of retransmissions permitted for each of the lost packets is equal to the non-zero value in the associated NRTx header field.

9. A system, comprising:
    one or more hardware processors;
    a communication interface; and
    a memory storing a plurality of instructions, wherein the plurality of instructions causes a transmitter executed by the one or more hardware processors to:
        acquire a target frame as input data;
        transmit a plurality of data packets of the target frame to a receiver executed by the one or more hardware processors, wherein each of the plurality of data packets is transmitted in one of a reliable mode and a best effort mode, wherein for each of the plurality of data packets transmitted in the reliable mode the transmitter awaits an acknowledgement (ACK) from the receiver for a current value of a dynamically adaptive timeout period, while continuing transmission of subsequent packets in the best effort mode in parallel;
        identify one or more of the data packets transmitted in the reliable mode as a lost packet, based on a reception status of the ACK; and
        dynamically determine whether the one or more data packets identified as the lost packet is to be retransmitted, by:
            identifying value of a NRTx header field associated with each of the lost packets as one of a zero value and a non-zero value;
            retransmitting the lost packet if the value of the associated NRTx header field is the non-zero value, wherein next transmitted packet is retransmission of the lost packet; and
            performing no retransmission of the lost packet if the value of the associated NRTx header field is a zero value, wherein the next transmitted packet is next original packet in line.

10. The system of claim 9, wherein the transmitter is configured to recalculate value of the dynamically adaptive timeout period, to generate an updated value of the dynamically adaptive timeout period, based on an instantaneous channel condition determined in terms of the ACK reception status, to minimize ACK loss caused due to a channel delay indicated by the instantaneous channel condition.

11. The system of claim 10, wherein the transmitter is configured to apply the updated value of the dynamically adaptive timeout period to next retransmission of the lost packet if the NRTx value is non-zero, and to next original packet transmitted reliably, if the NRTx value is zero.

12. The system of claim 9, wherein the reception status of the ACK indicates one of a) the ACK has been received within a defined timeout period, b) the ACK has not been received within the defined timeout period and c) number of successive successful reception of ACKs.

13. The system of claim 12, wherein for the lost packet the reception status indicates that the ACK was not received within the current value of the dynamically adaptive timeout period.

14. The system of claim 12, wherein for each of the plurality of data packets for which the reception status of ACK indicates that the ACK has been received within the defined timeout period, next transmitted packet is an original packet irrespective of value of the NRTx header field of a current data packet.

15. The system of claim 9, wherein the target frame is one of a basic type and a delta type.

16. The system of claim 9, wherein maximum number of retransmissions permitted for each of the lost packets is equal to the non-zero value in the associated NRTx header field.

17. One or more non-transitory machine-readable information storage mediums comprising one or more instructions which when executed by one or more hardware processors cause:
acquiring, by a transmitter executed by one or more hardware processors, a target frame as input data;
transmitting, by the transmitter, a plurality of data packets of the target frame to a receiver executed by the one or more hardware processors, wherein each of the plurality of data packets is transmitted in one of a reliable mode and a best effort mode, wherein for each of the plurality of data packets transmitted in the reliable mode the transmitter awaits an acknowledgement (ACK) from the receiver for a current value of a dynamically adaptive timeout period, while continuing transmission of subsequent packets in the best effort mode in parallel;
identifying, by the transmitter, one or more of the data packets transmitted in the reliable mode as a lost packet, based on a reception status of the ACK; and
dynamically determining, by the transmitter, whether the one or more data packets identified as the lost packet is to be retransmitted, further comprising:
identifying value of a NRTx (Maximum Number of Retransmissions) header field associated with each of the lost packets as one of a zero value and a non-zero value;
retransmitting the lost packet if the value of the associated NRTx header field is the non-zero value, wherein next transmitted packet is retransmission of the lost packet; and
performing no retransmission of the lost packet if the value of the associated NRTx header field is a zero value, wherein the next transmitted packet is an original packet.

18. The one or more non-transitory machine-readable information storage mediums of claim 17, wherein the one or more instructions which when executed by the one or more hardware processors further cause recalculating value of the dynamically adaptive timeout period, by the transmitter, to generate an updated value of the dynamically adaptive timeout period, based on an instantaneous channel condition determined in terms of the ACK reception status, to minimize ACK loss caused due to a channel delay indicated by the instantaneous channel condition.

19. The one or more non-transitory machine-readable information storage mediums of claim 18, wherein the updated value of the dynamically adaptive timeout period is applied to next retransmission of the lost packet if the NRTx value is non-zero, and to next original packet transmitted reliably if the NRTx value is zero.

20. The one or more non-transitory machine-readable information storage mediums of claim 17, wherein the reception status of the ACK indicates one of a) the ACK has been received within a defined timeout period, b) the ACK has not been received within the defined timeout period and c) number of successive successful reception of ACKs.

* * * * *